Patented May 6, 1930

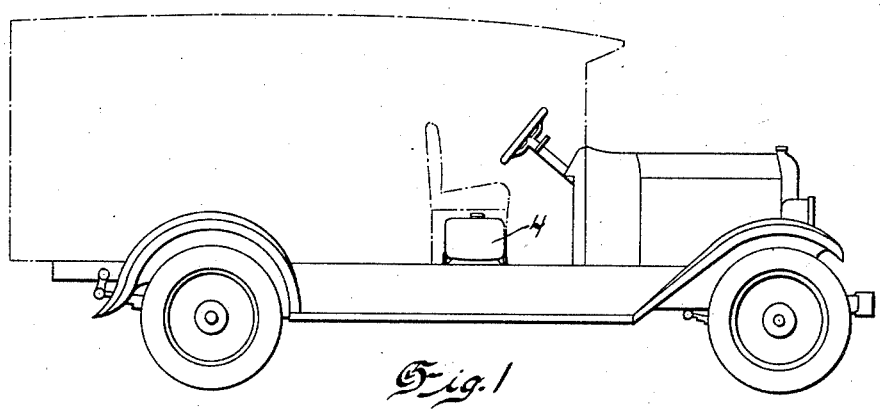
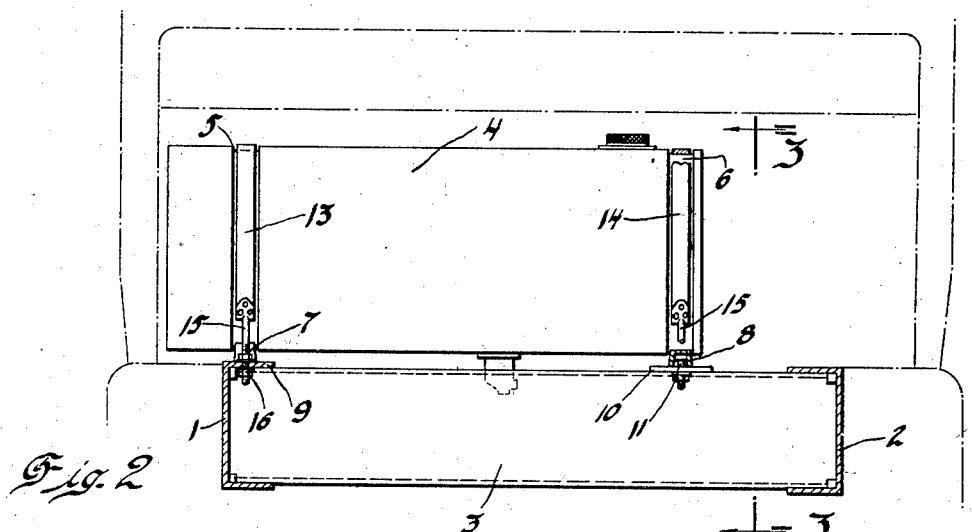
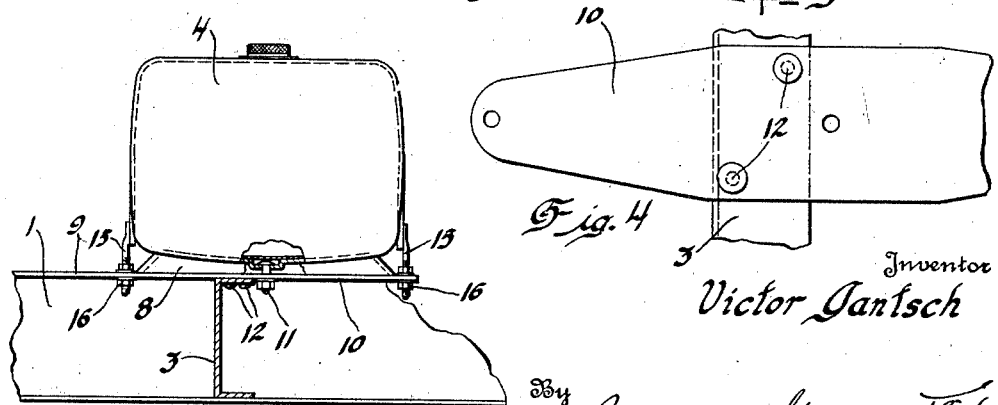

1,757,429

UNITED STATES PATENT OFFICE

VICTOR JANTSCH, OF PONTIAC, MICHIGAN, ASSIGNOR TO YELLOW TRUCK & COACH COMPANY, OF PONTIAC, MICHIGAN, A CORPORATION OF MAINE

GASOLINE-TANK MOUNTING

Application filed September 26, 1927. Serial No. 222,126.

This invention relates to motor vehicles and more particularly to an improvement in the manner of mounting an engine fuel supply tank on the chassis frame.

One of the primary objects of the invention is to provide a support involving but a few parts so as to be simple and economical in manufacture, and which, while being of sturdy construction, will have a certain degree of flexibility, so as to yield to relieve the tank of twisting strains incident to chassis frame weaving, when the vehicle is traveling uneven or rough roadways.

A preferred embodiment of the invention is illustrated in the accompanying drawing, wherein—

Figure 1 is a side elevation of a truck chassis, showing a gasoline tank mounted on the frame in a convenient position under the driver's seat;

Figure 2 is a transverse section of the chassis frame with the tank mounted thereon in accordance with the present invention;

Figure 3 is a section on line 3—3 of Figure 2; and

Figure 4 is a plan view illustrating in detail, one of the elements forming a part of the mounting.

Referring to the drawing the numerals 1 and 2 indicate a pair of longitudinal channel-shaped sills or side members of the chassis frame, which extend from front to rear of the vehicle on either side thereof, and the character 3 refers to one of the transverse cross members, also of channel shape, extending between and connecting the side members. The fuel tank 4 is shown positioned to one side of the vehicle and above the side member 1 and cross member 3, and is provided, adjacent opposite ends with encircling grooves or peripheral channels 5 and 6. The tank rests upon cradles 7 and 8, pressed from sheet metal or otherwise formed, which register with and extend into the grooves 5 and 6 in the bottom of the tank. The outer cradle 7 rests upon and is rigidly secured to the top flange 9 of the side frame member 1, while the inner cradle 8 rests upon and is rigidly secured to a flexible plate 10, preferably of spring steel, by means of a fastening bolt 11, as best shown in Figure 3. The plate 10, in turn, is secured at a mid-point by bolts or rivets 12 to the top flange of the cross member 3 at a point intermediate the side members 1 and 2. A pair of hold-down straps 13 and 14, seated within the grooves 5 and 6 respectively, and having attachment bolts 15 at each end which pass through openings in the top flange 9 of the frame member 1 and opposite ends of the plate 10, and have fastening nuts 16 screw-threaded thereon, rigidly securing the tank to the flange 9 and flexible plate 10.

Thus one end of the tank is rigidly supported throughout its entire transverse extent, while the opposite end is supported upon the flexible plate, mounted at a central point only. It will be apparent, therefore, that the tank will remain in the same relative position to the frame side member at all times, and that the flexible plate will bend or yield upon frame weaving to accommodate such fixed position of the tank, the tank body itself being thus relieved of all twisting strains and the harmful effects thereof.

While the above description has been more or less specific, it is to be understood that the invention is not limited to the exact details, and that such modifications may be made as come within the scope of the appended claims.

I claim:

1. In a motor vehicle, the combination with a chassis frame comprising a pair of side members and a connecting cross member, and a fuel tank to be mounted thereon, of a flexible plate carried by said cross member intermediate the side members, means to secure the tank adjacent one end on said plate and means to secure the tank adjacent the other end to one of the side frame members.

2. In a motor vehicle, the combination with a chassis frame comprising a pair of side members and a connecting cross member, and a fuel tank to be mounted thereon, of a flexible plate secured intermediate its ends to said cross member, and a pair of hold-down straps adapted to encircle opposite ends of the tank, one of the straps being secured to one of the side frame members to hold the tank substantially rigid with respect thereto and the other strap being secured to the ends of said flexible plate, said plate being adapted to yield to relieve the tank of twisting strain upon frame weaving.

3. In a motor vehicle, the combination of chassis frame members and a fuel tank to be mounted thereon, of a spring plate secured at an intermediate point to one of the frame members, means to secure the tank adjacent one end to the opposite ends of said plate, and means to rigidly fasten the opposite end of the tank to another of said members.

4. In a motor vehicle, the combination of chassis frame members and a fuel tank to be mounted thereon, of a spring plate secured at an intermediate point to one of the frame members and extending transversely thereof, a pair of encircling straps passing around opposite ends of the tank and secured respectively to opposite ends of the spring plate and to another of the frame members, and cradles interposed between the tank and the spring plate and the last mentioned frame member.

In testimony whereof I affix my signature.

VICTOR JANTSCH.